(12) United States Patent
Chalmers et al.

(10) Patent No.: US 8,908,177 B2
(45) Date of Patent: Dec. 9, 2014

(54) CORRECTION OF SECOND-ORDER DIFFRACTION EFFECTS IN FIBER-OPTIC-BASED SPECTROMETERS

(71) Applicant: Filmetrics, Inc., San Diego, CA (US)

(72) Inventors: Scott A. Chalmers, San Diego, CA (US); Randall S. Geels, San Diego, CA (US)

(73) Assignee: Filmetrics, Inc., San Diego, CA (US)

( * ) Notice: Subject to any disclaimer, the term of this patent is extended or adjusted under 35 U.S.C. 154(b) by 0 days.

(21) Appl. No.: 13/743,038

(22) Filed: Jan. 16, 2013

(65) Prior Publication Data

US 2013/0258333 A1    Oct. 3, 2013

Related U.S. Application Data

(60) Provisional application No. 61/586,943, filed on Jan. 16, 2012.

(51) Int. Cl.
*G01J 3/28*    (2006.01)
*G01J 3/10*    (2006.01)

(52) U.S. Cl.
CPC ...... *G01J 3/10* (2013.01); *G01J 3/28* (2013.01)
USPC .......................................... 356/326; 356/300

(58) Field of Classification Search
USPC ......................................... 356/326, 300, 319
See application file for complete search history.

(56) References Cited

U.S. PATENT DOCUMENTS 4,927,269 A * 5/1990 Keens et al. .................. 356/451

* cited by examiner

*Primary Examiner* — Tri T Ton
(74) *Attorney, Agent, or Firm* — IPR Law Group, PC

(57) ABSTRACT

Embodiments described herein correct errors in spectrometer outputs due to the presence of second-order light. Embodiments determine a relationship between first-order light and second-order light of the spectrometer output. The relationship is a function of wavelength and an output of the spectrometer due to the first-order light. The relationship is used to determine an estimated contribution of the second-order light to the output. Spectrometer errors introduced by the second-order light are corrected by adjusting the spectrometer output according to the estimated contribution of the second-order light.

31 Claims, 3 Drawing Sheets

CORRECTION OF SECOND-ORDER DIFFRACTION EFFECTS IN FIBER-OPTIC-BASED SPECTROMETERS

RELATED APPLICATION

This application claims the benefit of U.S. Patent Application No. 61/586,943, filed Jan. 16, 2012.

TECHNICAL FIELD

This invention relates generally to the field of optical spectrometers.

BACKGROUND

Compact fiber-optic detector-array-based spectrometers ("miniature spectrometers") pioneered by H.-E. Korth of IBM Germany and popularized most notably by Ocean Optics, Inc. have found widespread use in a multitude of applications. For example, see "A Computer Integrated Spectrophotometer for Film Thickness Monitoring," H.-E. Korth, IBM Germany, JOURNAL DE PHYSIQUE, Colloque CIO, Supplement Number 12, Tome M, December 1983, pg. C10-101. Because the purpose of an optical spectrometer is to measure the intensity of light as a function of wavelength, the accuracy of a miniature spectrometer's responsiveness to light is of primary importance. Sources of error that can reduce accuracy and must be minimized or corrected for include detector non-linearity, scattered light (light that is scattering inside of the spectrometer's optical bench that makes its way to the detector), and second-order diffraction.

Most miniature spectrometers use diffraction gratings to spread out the light to be analyzed into its constituent wavelengths. This light is then focused onto a detector comprised of a linear array of individual detector pixels. The light that strikes a particular pixel is determined by the angle by which the light departs the diffraction grating. This angle is related to the light's wavelength by the well-known diffraction grating equation $d*\sin\theta_m = m*\lambda$, where d is the grating spacing, $\theta_m$ is the diffraction angle, m is an integer, and $\lambda$ is the wavelength. With d being a fixed property of the diffraction grating, it can be seen that a given angle (and thus a given pixel) corresponds to multiple wavelengths, each paired with a different integer values of m.

Conventional diffraction gratings are designed so that most of the light striking the grating winds up in the "first-order beam", which corresponds to m=1. In the ideal case of no light in the higher order beams (m>1) the light departing the diffraction grating has a unique correspondence between the wavelength $\lambda$ and the angle $\theta$ (and thus the detector pixels). In practice, however, some appreciable amount of light makes it into the second-order beam, so that the light striking a particular pixel can be a combination of light from the first- and second-order beams. For example, the pixel that receives $\lambda=1000$ nm first-order (m=1) light might also receive $\lambda=500$ nm second-order (m=2) light. Light of different wavelengths is indistinguishable to the detector pixels, so the resultant intensity of light detected by the pixel (and thus reported to the user by the spectrometer) is an unknown mixture of the two wavelengths. Because the purpose of any optical spectrometer is to measure the intensity of light as a function of wavelength, this mixing of light of different wavelengths is a source of error.

To avoid the problem of second-order diffraction, some spectrometers simply measure over less than a factor of two in wavelength range (e.g., 400-800 nm) and restrict shorter wavelengths from entering the spectrometer (or at least reaching the detector). Since the majority of spectrometer uses require a greater wavelength range than allowed by this method, most miniature spectrometers block second-order light from reaching the detector array by aligning a linearly-graded optical high-pass filter in front of the array. The high-pass cutoff of the filter must be graded along the direction of the detector array because different pixels detect different wavelengths and thus require different second-order light to be either passed or filtered out.

Linearly-graded high-pass filters work well to remove second-order light in practice and are manufactured into tens of thousands of spectrometers a year. However, the linear grading makes the filters expensive to produce (approximately $100 each) and they require careful alignment to the detector during the spectrometer's manufacture.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

BRIEF DESCRIPTION OF THE DRAWINGS

The components in the figures are not necessarily to scale, emphasis instead being placed upon illustrating the principles of the embodiments. In the figures, like reference numerals designate corresponding parts throughout the different views.

DETAILED DESCRIPTION

Miniature spectrometers are operated over all or most of the wavelength range of 380-1050 nm, which is the overlap of the effective wavelength range of silicon-based array detectors (200-1050 nm) and tungsten-halogen light sources (380-2000 nm). Embodiments described herein correct errors due to the presence of second-order light using a method of correcting for second-order diffraction effects in spectrometers by processing the spectrometer output that contains the second-order diffraction response, i.e., without having to remove the second-order diffraction with costly optical filters. More particularly, embodiments described herein determine a relationship between first-order light and second-order light of the spectrometer output. The relationship is a function of wavelength and an output of the spectrometer due to the first-order light. The relationship is used to determine an estimated contribution of the second-order light to the output. Spectrometer errors introduced by the second-order light are corrected by adjusting the spectrometer output according to the estimated contribution of the second-order light.

Figure 1:
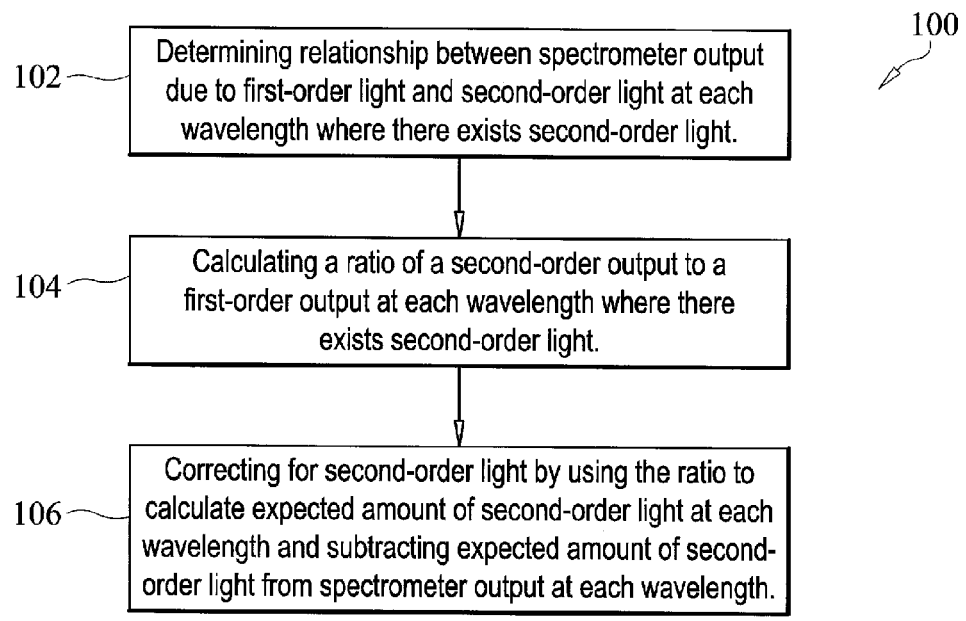
FIG. 1 is a flow diagram for correcting errors due to the presence of second-order light, under an embodiment.

FIG. 1 is a flow diagram for correcting errors 100 due to the presence of second-order light, under an embodiment. Embodiments described herein generally correct errors due to the presence of second-order light by removing the second-order signal from the spectrometer output. Embodiments remove the second-order signal from the spectrometer output by determining 102 the relationship between the spectrometer output due to first-order and second-order light at each wavelength where there exists second-order light. This is done using the spectrometer output when no first-order light is input into the spectrometer in the wavelength range where there exists second-order light. The ratio of the second-order to first-order output is calculated 104 at each wavelength where there exists second-order light. The ratio is used to calculate 106 the expected amount of second-order light at each wavelength, and then this amount is subtracted from the spectrometer output at each wavelength.

The following description assumes that other sources of error in the measured light intensity, such as detector non-linearity and scattered light, are minimal or have previously been corrected. Further, the basis of the embodiments herein include, but are not limited to, the following: second-order light from the diffraction grating is proportional to the first-order light for each wavelength; the relationship between first-order light and second-order light can be determined as a function of wavelength; the relationship between first-order light and second-order light can be used along with the measured first-order light to determine the contribution of second-order light to a spectrometer's output in real time and to thus correct for the contribution of second-order light.

Figure 2:
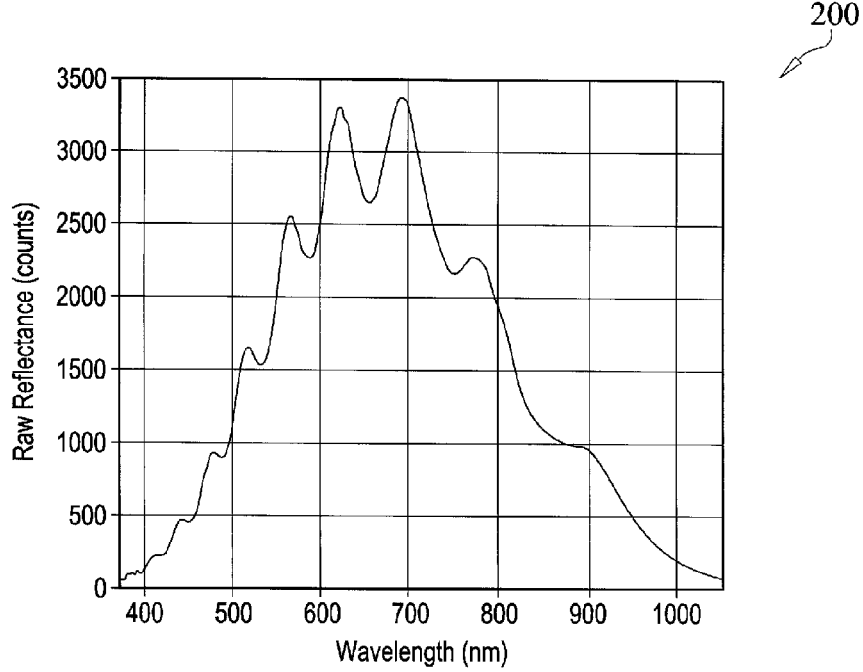
FIG. 2 is a plot of output from a miniature spectrometer that is measuring the output of a tungsten-halogen lamp.

FIG. 2 is a plot 200 of output from a miniature spectrometer that is measuring the output of a tungsten-halogen lamp. The output at each wavelength is a product of the lamp intensity and the response of the various spectrometer components, most notably the diffraction grating and the silicon detector array. The output decreases at shorter wavelengths primarily because the tungsten-halogen lamp intensity drops rapidly below wavelengths of approximately 500 nm. The output decreases at longer wavelengths primarily because the silicon detector array sensitivity drops rapidly above wavelengths of approximately 800 nm. The diffraction grating first-order efficiency also drops away above and below wavelengths in a range of approximately 500-600 nm. This particular spectrometer has a linearly-graded second-order filter in front of the detector array, so no second-order light is being detected or included in the plotted output.

Figure 3:
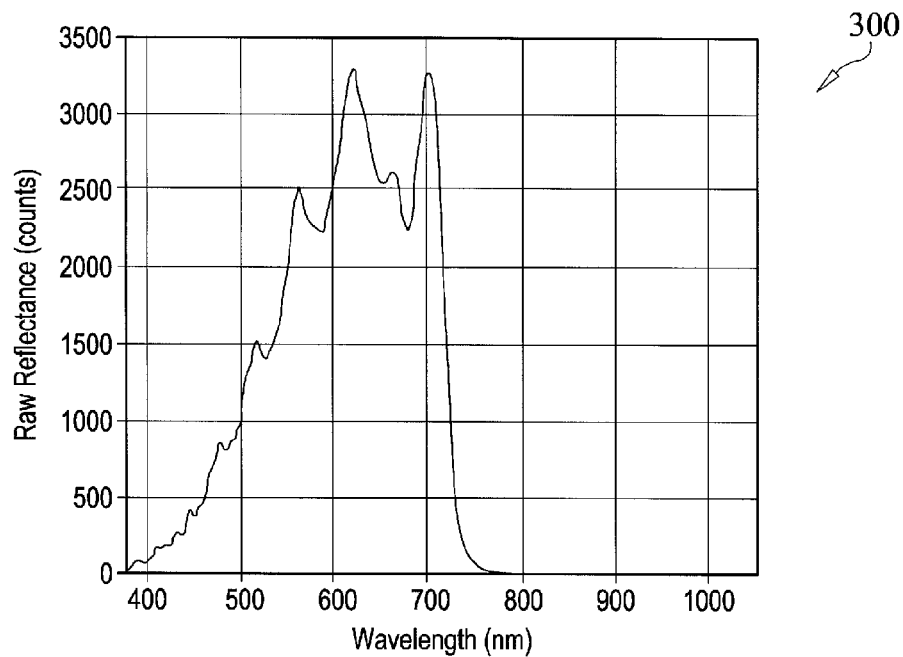
FIG. 3 is a plot of the output of a miniature spectrometer that is measuring the output of a tungsten-halogen lamp when only light below wavelengths of approximately 750 nm is allowed to pass into the spectrometer, and second-order light is blocked from reaching the detector by a second-order filter.

FIG. 3 is a plot 300 of the output of a miniature spectrometer that is measuring the output of a tungsten-halogen lamp when only light below wavelengths of approximately 750 nm is allowed to pass into the spectrometer. In this configuration a second-order linear filter is positioned in front of the spectrometer detector array to remove second-order light from the wavelength range above 760 nm. The second-order linear filter is a high-pass filter positioned in front of the spectrometer's detector array. In front of the detector array's pixel that is meant to detect 1000 nm first-order light this second-order filter blocks the second-order light (500 nm in this case) and passes the 1000 nm first-order light. Because it must be in front of the entire detector array (to avoid introducing discontinuities in the light detected by the array), the same second-order filter must also pass the first-order light over the entire detector array. In practice this is accomplished by linearly grading the thicknesses of the filter's component film stack over the length of the detector array. In this way, for example, it can block 500 nm light in front of the 1000 nm pixel, while still passing 380 nm light in front of the 380 nm pixel. In this configuration there is no light input to the spectrometer above wavelengths of approximately 750 nm, and it can be seen that no significant amount of light is detected above wavelengths of approximately 750 nm. This last fact means that the second-order filter is successfully blocking second-order light from reaching the detector array.

Figure 4:
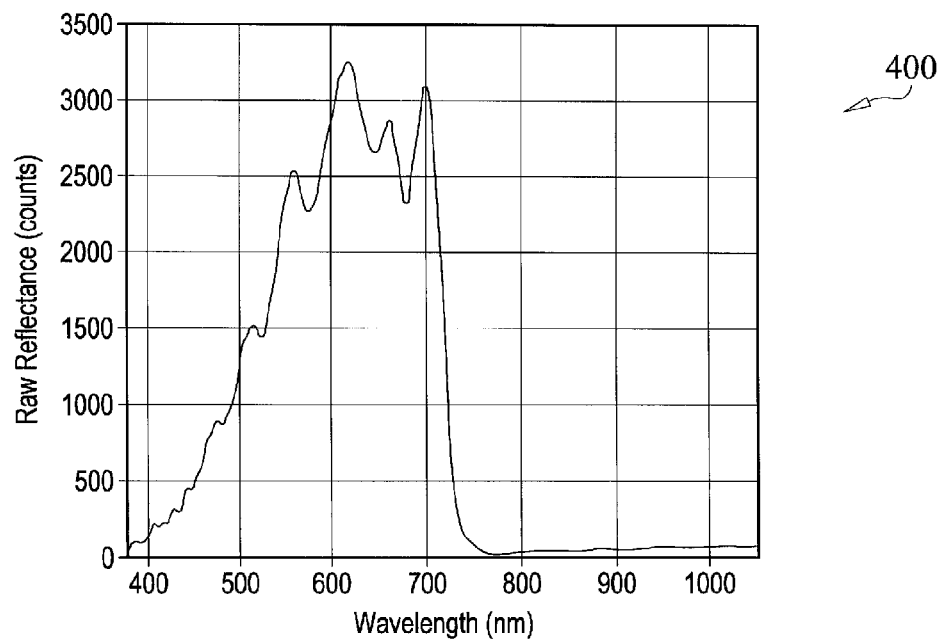
FIG. 4 is a plot of the output of a typical miniature spectrometer that is measuring the output of a tungsten-halogen lamp when only light below wavelengths of approximately 750 nm is allowed to pass into the spectrometer, and the second-order filter is removed and thus second-order light appears in the first-order wavelength range above 760 nm.

FIG. 4 is a plot 400 of the output of a typical miniature spectrometer that is measuring the output of a tungsten-halogen lamp when only light below a wavelength of approximately 750 nm is allowed to pass into the spectrometer. In this case there is no linearly-graded filter in front of the spectrometer's detector array to remove second-order light, so that second-order light is being detected at wavelengths above approximately 760 nm. This plot 400 is obtained using the same equipment configuration as that used to obtain the plot 300 described above, except that the second-order filter has been removed. In this case it can be clearly seen that second-order light is reaching the detector array in the range of wavelengths of approximately 760-1050 nm. The second-order signal increases with wavelength at wavelengths between approximately 760-1050 nm because the intensity of the tungsten-halogen lamp increases strongly between approximately 380-525 nm. At a wavelength of approximately 1050 nm, the amount of second-order light (which is actually light of wavelength 525 nm) is nearly as strong as the first-order light seen in plot 100. Clearly the second-order light will be a source of error if it is present and not corrected for.

Embodiments described herein remove the second-order signal from the spectrometer output. The embodiments remove the second-order signal from the spectrometer output by determining, for the spectrometer of interest, the relationship between the spectrometer output due to first-order and second-order light at each wavelength $\lambda$ where there exists second-order light. This is done using the spectrometer output when no first-order light is input into the spectrometer in the wavelength range where there exists second-order light, such as under the conditions described above with reference to plot 400.

Embodiments then calculate the ratio (called here $R_{21}(\lambda)$) of the second-order output $I(\lambda)$ to first-order output $(I(\lambda/2))$ at each wavelength where there exists second-order light, where $I(\lambda)$ is the intensity (i.e., counts in FIG. 4) of the spectrometer output at wavelength $\lambda$. In equation form, $R_{21}(\lambda)=I(\lambda)/I(\lambda/2)$. In practice this typically involves some interpolation because the spectrometer output is usually at discrete wavelengths corresponding to individual detector array pixels, and the pixels in the first-order wavelength range rarely fall at exactly one-half the wavelength of the second-order pixels. For example, if the second-order pixel is at wavelength $\lambda=1000$ nm and the two first-order pixels closest to wavelength $\lambda/2=500$ nm are at wavelengths 499.6 nm and 500.6 nm, then by a linear interpolation $R_{21}(1000 \text{ nm})=I(1000 \text{ nm})/[I(499.6)*(1-(500-499.6)/(500.6-499.6))+I(500.6)*(1-(500.6-500)/(500.6-499.6))]$.

Once $R_{21}(\lambda)$ is calculated for all pixels in the second-order range of wavelengths it is used to correct for second-order light during general use of the spectrometer, i.e., even when light is entering the spectrometer over its entire wavelength range, including light of wavelengths that result in first-order light falling in the range where second-order light can be present. This is done by using $R_{21}(\lambda)$ to calculate the expected amount of second-order light $I_{2E}(\lambda)$ at each wavelength using the equation $I_{2E}(\lambda)=R_{21}(\lambda)*I(\lambda/2)$, and then subtracting this amount from the spectrometer output at each wavelength. As above, these calculations generally require some interpolation between pixels.

Figure 5:
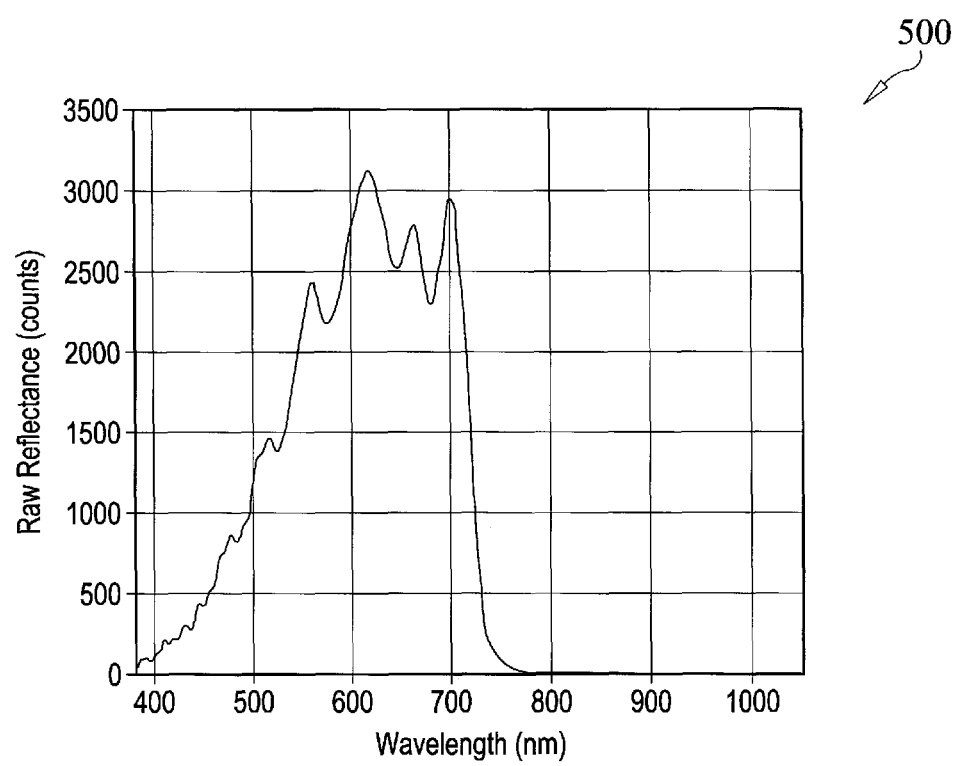
FIG. 5 is a plot of the output of the spectrometer in FIG. 4, except that the contribution from the second-order light has been removed by subtracting the calculated values, under an embodiment.

The result of this process on the spectrometer output for the type of configuration corresponding to plot 400 described above is shown in FIG. 5, which shows a plot 500 the output of the spectrometer in plot 400, except that the contribution from the second-order light has been removed by subtracting the calculated values, under an embodiment. Essentially the entire signal due to second-order order light has been removed and the spectrum looks effectively the same as that of the spectrometer with the second-order linear filter shown in plot 300 described above.

Embodiments described herein include a system comprising a spectrometer. The system comprises an illumination source coupled to the spectrometer. A relationship is determined between first-order light output and second-order light output of the spectrometer. The relationship is a function of wavelength and first-order light output of the spectrometer. An estimated contribution of the second-order light output of the spectrometer is determined with the relationship. Spectrometer errors introduced by the second-order light output are corrected by adjusting the spectrometer output according to the estimated contribution.

Embodiments described herein include a system comprising: a spectrometer; and an illumination source coupled to the spectrometer, wherein a relationship is determined between first-order light output and second-order light output of the spectrometer, wherein the relationship is a function of wavelength and first-order light output of the spectrometer, wherein an estimated contribution of the second-order light output of the spectrometer is determined with the relationship, wherein spectrometer errors introduced by the second-order light output are corrected by adjusting the spectrometer output according to the estimated contribution.

A wavelength range of an embodiment that comprises second-order light is determined for the illumination source.

The relationship of an embodiment comprises a ratio of a second-order output to a first-order output.

The ratio of an embodiment is determined for a plurality of discrete wavelengths within a wavelength range.

The estimated contribution of an embodiment is determined by calculating with use of the ratio the expected amount of second-order light.

The estimated contribution of an embodiment is calculated by multrying the ratio by the first-order output.

The estimated contribution of an embodiment is determined for a plurality of discrete wavelengths within the wavelength range.

The spectrometer output of an embodiment is adjusted by subtracting the estimated contribution of the second-order light from the spectrometer output.

The wavelength range of an embodiment comprises a plurality of discrete wavelengths, wherein each discrete wavelength corresponds to a set of pixels of a detector of the spectrometer.

The spectrometer errors of an embodiment are corrected for by removing signal due to second-order light from an output of the spectrometer instead of positioning a linear-filter in front of the detector.

The illumination of an embodiment is controlled by diffracting light of the illumination source.

For each wavelength of the diffracted light, the second-order light of an embodiment is proportional to first-order light.

A relationship between the first-order light and the second-order light of an embodiment is a function of wavelength.

A relationship of an embodiment is used between the first-order light and the second-order light along with measured first-order light to determine a contribution of the second-order light to an output of the spectrometer.

Embodiments described herein include a system comprising a spectrometer. The system comprises an illumination source coupled to the spectrometer. A relationship is determined between first-order light output and second-order light output of the spectrometer. The relationship is a function of the first-order light output of the spectrometer. An estimated contribution of the second-order light output of the spectrometer is determined with the relationship. Spectrometer errors introduced by the second-order light output are corrected by subtracting the estimated contribution from the spectrometer output.

Embodiments described herein include a system comprising: a spectrometer; and an illumination source coupled to the spectrometer, wherein a relationship is determined between first-order light output and second-order light output of the spectrometer, wherein the relationship is a function of the first-order light output of the spectrometer, wherein an estimated contribution of the second-order light output of the spectrometer is determined with the relationship, wherein spectrometer errors introduced by the second-order light output are corrected by subtracting the estimated contribution from the spectrometer output.

Embodiments described herein include a method comprising coupling an illumination source to a spectrometer. The method comprises determining a relationship between first-order light and second-order light output by the spectrometer. The relationship is a function of wavelength and an output of the spectrometer due to the first-order light. The method comprises determining by using the relationship an estimated contribution of the second-order light to the output. The method comprises correcting for spectrometer errors introduced by the second-order light by adjusting the spectrometer output according to the estimated contribution of the second-order light.

Embodiments described herein include a method comprising: coupling an illumination source to a spectrometer; determining a relationship between first-order light and second-order light output by the spectrometer, wherein the relationship is a function of wavelength and an output of the spectrometer due to the first-order light; determining by using the relationship an estimated contribution of the second-order light to the output; and correcting for spectrometer errors introduced by the second-order light by adjusting the spectrometer output according to the estimated contribution of the second-order light.

The determining of the relationship of an embodiment comprises controlling the illumination source to prevent admission of the first-order light in a wavelength range that comprises the second-order light.

The method of an embodiment comprises determining for the illumination source a wavelength range that comprises second-order light.

The determining of the estimated contribution of an embodiment comprises determining an expected amount of second-order light at each of the wavelengths.

The determining of the relationship of an embodiment comprises determining a ratio of a second-order light output to a first-order light output.

The method of an embodiment comprises determining the ratio for a plurality of discrete wavelengths within the wavelength range.

The determining of the estimated contribution of an embodiment comprises calculating with use of the ratio the estimated contribution of second-order light output.

The calculating of the estimated contribution of an embodiment comprises multiplying the ratio by the first-order light output.

The method of an embodiment comprises determining the estimated contribution for a plurality of discrete wavelengths within the wavelength range.

The adjusting of the spectrometer output of an embodiment comprises subtracting the estimated contribution of the second-order light output from the spectrometer output.

The wavelength range of an embodiment comprises a plurality of discrete wavelengths, wherein each discrete wavelength corresponds to a set of pixels of a detector of the spectrometer.

The correcting for the spectrometer errors of an embodiment comprises removing signal due to second-order light output from an output of the spectrometer instead of positioning a linear-filter in front of the detector.

The controlling of the illumination of an embodiment comprises diffracting light of the illumination source.

For each wavelength of the diffracted light of an embodiment, the second-order light is proportional to first-order light.

The method of an embodiment comprises using a relationship between the first-order light and the second-order light along with measured first-order light to determine a contribution of the second-order light to an output of the spectrometer.

Embodiments described herein include a method comprising determining a relationship between first-order light and second-order light output by the spectrometer. The relationship is a function of an output of the spectrometer due to the first-order light. The method comprises determining by using the relationship an estimated contribution of the second-order light to the output. The method comprises correcting for spectrometer errors introduced by the second-order light by subtracting the estimated contribution from the spectrometer output.

Embodiments described herein include a method comprising: determining a relationship between first-order light and second-order light output by the spectrometer, wherein the relationship is a function of an output of the spectrometer due to the first-order light; determining by using the relationship an estimated contribution of the second-order light to the output; and correcting for spectrometer errors introduced by the second-order light by subtracting the estimated contribution from the spectrometer output.

Embodiments described herein include a method comprising controlling an illumination source of a spectrometer to prevent admission of first-order light in a wavelength range that comprises second-order light. The method comprises determining for wavelengths within the wavelength range a relationship between an output of the spectrometer due to first-order light and the output due to second-order light. The method comprises determining with use of the relationship an expected amount of second-order light at each of the wavelengths. The method comprises correcting for spectrometer errors due to presence of the second-order light by adjusting the spectrometer output according to the expected amount of the second-order light.

Embodiments described herein include a method comprising: controlling an illumination source of a spectrometer to prevent admission of first-order light in a wavelength range that comprises second-order light; determining for wavelengths within the wavelength range a relationship between an output of the spectrometer due to first-order light and the output due to second-order light; determining with use of the relationship an expected amount of second-order light at each of the wavelengths; and correcting for spectrometer errors due to presence of the second-order light by adjusting the spectrometer output according to the expected amount of the second-order light.

Embodiments described herein include a method comprising determining spectrometer output absent first-order light input in a wavelength range where there exists second-order light. The method comprises determining for the wavelength range a relationship between the spectrometer output due to the first-order light and spectrometer output due to second-order light at each wavelength where there exists second-order light. The method comprises correcting for the second-order light by using the relationship to calculate an expected amount of the second-order light at each wavelength, and subtracting the expected amount of the second-order light from the spectrometer output at each wavelength.

Embodiments described herein include a method comprising: determining spectrometer output absent first-order light input in a wavelength range where there exists second-order light; determining for the wavelength range a relationship between the spectrometer output due to the first-order light and spectrometer output due to second-order light at each wavelength where there exists second-order light; and correcting for the second-order light by using the relationship to calculate an expected amount of the second-order light at each wavelength, and subtracting the expected amount of the second-order light from the spectrometer output at each wavelength.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the spectrometer systems and methods is not intended to be exhaustive or to limit the systems and methods described to the precise form disclosed. While specific embodiments of, and examples for, the reflectance systems and methods are described herein for illustrative purposes, various equivalent modifications are possible within the scope of other spectrometer systems and methods, as those skilled in the relevant art will recognize. The teachings of the spectrometer systems and methods provided herein can be applied to other processing and measurement systems and methods, not only for the systems and methods described above.

The elements and acts of the various embodiments described above can be combined to provide further embodiments. These and other changes can be made to the spectrometer systems and methods in light of the above detailed description.

In general, in the following claims, the terms used should not be construed to limit the spectrometer systems and methods to the specific embodiments disclosed in the specification and the claims, but should be construed to include all systems and methods that operate under the claims. Accordingly, the spectrometer systems and methods are not limited by the disclosure, but instead the scope of the spectrometer systems and methods is to be determined entirely by the claims.

While certain aspects of the spectrometer systems and methods are presented below in certain claim forms, the inventors contemplate the various aspects of the spectrometer systems and methods in any number of claim forms. Accordingly, the inventors reserve the right to add additional claims after filing the application to pursue such additional claim forms for other aspects of the spectrometer systems and methods.

What is claimed is:

1. A system comprising:
    a spectrometer; and
    an illumination source coupled to the spectrometer, wherein a relationship is determined between first-order light output and second-order light output of the spectrometer, wherein the relationship is a function of wavelength and first-order light output of the spectrometer, wherein an estimated contribution of the second-order light output of the spectrometer is determined with the relationship, wherein spectrometer errors introduced by the second-order light output are corrected by adjusting the spectrometer output according to the estimated contribution.

2. The system of claim 1, wherein a wavelength range that comprises second-order light is determined for the illumination source.

3. The system of claim 2, wherein the relationship comprises a ratio of a second-order output to a first-order output.

4. The system of claim 3, wherein the ratio is determined for a plurality of discrete wavelengths within a wavelength range.

5. The system of claim 3, wherein the estimated contribution is determined by calculating with use of the ratio the expected amount of second-order light.

6. The system of claim 5, wherein the estimated contribution is calculated by multiplying the ratio by the first-order output.

7. The system of claim 5, wherein the estimated contribution is determined for a plurality of discrete wavelengths within the wavelength range.

8. The system of claim 5, wherein the spectrometer output is adjusted by subtracting the estimated contribution of the second-order light from the spectrometer output.

9. The system of claim 2, wherein the wavelength range comprises a plurality of discrete wavelengths, wherein each discrete wavelength corresponds to a set of pixels of a detector of the spectrometer.

10. The system of claim 9, wherein the spectrometer errors are corrected for by removing signal due to second-order light from an output of the spectrometer instead of positioning a linear-filter in front of the detector.

11. The system of claim 2, wherein the illumination is controlled by diffracting light of the illumination source.

12. The system of claim 11, wherein, for each wavelength of the diffracted light, the second-order light is proportional to first-order light.

13. The system of claim 1, wherein a relationship between the first-order light and the second-order light is a function of wavelength.

14. The system of claim 1, wherein a relationship is used between the first-order light and the second-order light along with measured first-order light to determine a contribution of the second-order light to an output of the spectrometer.

15. A method comprising:
    coupling an illumination source to a spectrometer;
    determining a relationship between first-order light and second-order light output by the spectrometer, wherein the relationship is a function of wavelength and an output of the spectrometer due to the first-order light;
    determining by using the relationship an estimated contribution of the second-order light to the output; and
    correcting for spectrometer errors introduced by the second-order light by adjusting the spectrometer output according to the estimated contribution of the second-order light.

16. The method of claim 15, wherein the determining of the relationship comprises controlling the illumination source to prevent admission of the first-order light in a wavelength range that comprises the second-order light.

17. The method of claim 15, comprising determining for the illumination source a wavelength range that comprises second-order light.

18. The method of claim 17, wherein the determining of the estimated contribution comprises determining an expected amount of second-order light at each of the wavelengths.

19. The method of claim 17, wherein the determining of the relationship comprises determining a ratio of a second-order light output to a first-order light output.

20. The method of claim 19, comprising determining the ratio for a plurality of discrete wavelengths within the wavelength range.

21. The method of claim 19, wherein the determining of the estimated contribution comprises calculating with use of the ratio the estimated contribution of second-order light output.

22. The method of claim 21, wherein the calculating of the estimated contribution comprises multiplying the ratio by the first-order light output.

23. The method of claim 21, comprising determining the estimated contribution for a plurality of discrete wavelengths within the wavelength range.

24. The method of claim 21, wherein the adjusting of the spectrometer output comprises subtracting the estimated contribution of the second-order light output from the spectrometer output.

25. The method of claim 17, wherein the wavelength range comprises a plurality of discrete wavelengths, wherein each discrete wavelength corresponds to a set of pixels of a detector of the spectrometer.

26. The method of claim 25, wherein the correcting for the spectrometer errors comprises removing signal due to second-order light output from an output of the spectrometer instead of positioning a linear-filter in front of the detector.

27. The method of claim 17, wherein the controlling of the illumination comprises diffracting light of the illumination source.

28. The method of claim 27, wherein, for each wavelength of the diffracted light, the second-order light is proportional to first-order light.

29. The method of claim 17, comprising using a relationship between the first-order light and the second-order light along with measured first-order light to determine a contribution of the second-order light to an output of the spectrometer.

30. A system comprising:
    a spectrometer; and
    an illumination source coupled to the spectrometer, wherein a relationship is determined between first-order light output and second-order light output of the spectrometer, wherein the relationship is a function of the first-order light output of the spectrometer, wherein an estimated contribution of the second-order light output of the spectrometer is determined with the relationship, wherein spectrometer errors introduced by the second-order light output are corrected by subtracting the estimated contribution from the spectrometer output.

31. A method comprising:

determining a relationship between first-order light and second-order light output by the spectrometer, wherein the relationship is a function of an output of the spectrometer due to the first-order light;

determining by using the relationship an estimated contribution of the second-order light to the output; and correcting for spectrometer errors introduced by the second-order light by subtracting the estimated contribution from the spectrometer output.

* * * * *